Patented Nov. 18, 1924.

1,516,113

UNITED STATES PATENT OFFICE.

ERWIN F. MOLDENHAUER AND LE ROY M. BICKETT, OF WATERTOWN, WISCONSIN, ASSIGNOR TO SUMMIT MARL CO. INC., OF WATERTOWN, WISCONSIN.

PARTING MATERIAL FOR MOLDING FLASKS.

No Drawing. Application filed January 27, 1923. Serial No. 615,372.

*To all whom it may concern:*

Be it known that we, ERWIN F. MOLDENHAUER and LE ROY M. BICKETT, both citizens of the United States, and residents of Watertown, in the county of Jefferson and State of Wisconsin, have invented certain new and useful Improvements in Parting Material for Molding Flasks; and we do hereby declare that the following is a full, clear, and exact description thereof.

Hitherto difficulty has been experienced in molding by reason of the irregular and rough surfaces that have been imparted to the castings. Applicants provide a novel substance adapted to be spread in a thin layer in the flask over parting surfaces and over patterns, the novel composition eliminating the roughness of surface and making smooth castings. The substance affords an excellent substitute for parting sand and permits ready separation of cope from drag.

The object of the invention is the provision of a novel process for making the novel composition. Ground and screened marl is mixed and heated with scale wax until the wax is absorbed forming a dry powder. The process is simple and easy to carry out.

The invention is not limited to minor details but is capable of extensive modification and a substantial range of equivalence within the scope of the appended claim is contemplated.

Applicants use marl as an important constituent to the novel substance. The material is ground to a fine powder and is then subjected to a screening operation. Wax of a desired type such as scale wax or paraffin is employed. It is heated to boiling in a vat, the screened marl is then fed into the wax and mixed therewith being agitated and heated so that a uniform mixture results. The mixing process is carried on until the wax is entirely absorbed and a dry powder is produced. It is preferred that the resulting substance consist in a unit weight of the following fractions by weight of constituents.

| | |
|---|---|
| Silica | .008 |
| Iron oxide | .001 |
| Aluminum oxide | .001 |
| Calcium carbonate | .577 |
| Magnesium carbonate | .036 |
| Potassium oxide | .002 |
| Wax | .375 |

In other words 62½ pounds of marl are mixed with material.

The resulting powder may be re-ground and re-screened if desired though these steps are not essential to the process.

The novel composition is useful in molding operations. In the initial molding steps the drag is placed in an inverted position on a work table, a pattern is rested on the table in the drag and the composition is spread in a thin layer over the pattern, and from wall to wall of the drag. The molding sand is then packed in. The subsequent steps of the molding operation are then carried out as heretofore. The novel composition provides an excellent substitute for the parting sand, in that it permits ready separation of the cope from the drag, and it is furthermore operative to give the casting a perfectly smooth surface free from all roughness and irregularities. The surfaces with which the castings contact in the mold are made perfectly smooth by the parting material so that when the casting is removed the surface thereof is free entirely from blemishes and pores such as have resulted heretofore from the molding sand.

We claim:

A powder for use in molding consisting of finely ground solid material of substantially the following proportions, silica .008, iron oxide .001, aluminum oxide .001, calcium carbonate .577, magnesium carbonate .036, potassium oxide .002, mineral wax .375, said solid material being coated and impregnated with the mineral wax.

In the testimony that we claim the foregoing we have hereunto set our hands at Milwaukee, in the county of Milwaukee and State of Wisconsin.

ERWIN F. MOLDENHAUER.
LE ROY M. BICKETT.